(12) United States Patent
Kurakawa et al.

(10) Patent No.: US 7,261,358 B2
(45) Date of Patent: Aug. 28, 2007

(54) WINDSCREEN APPARATUS

(75) Inventors: Yukinori Kurakawa, Saitama (JP); Yukiya Ueda, Saitama (JP); Haruomi Sugita, Saitama (JP); Osamu Suzuki, Saitama (JP); Takefumi Okubo, Saitama (JP); Hiroyuki Ozawa, Saitama (JP); Kenji Tako, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/184,930

(22) Filed: Jul. 20, 2005

(65) Prior Publication Data

US 2006/0022490 A1 Feb. 2, 2006

(30) Foreign Application Priority Data

Jul. 28, 2004 (JP) ............................. 2004-220181

(51) Int. Cl.
*B62J 17/04* (2006.01)
(52) U.S. Cl. .................................................. 296/78.1
(58) Field of Classification Search ............... 296/78.1; 454/122
See application file for complete search history.

(56) References Cited

U.S. PATENT DOCUMENTS

| 1,712,154 | A | * | 5/1929 | Mingo et al. ............... 454/122 |
| 1,846,434 | A | * | 2/1932 | Osborne ..................... 454/122 |
| 2,659,942 | A | * | 11/1953 | Iverson ...................... 454/127 |
| 5,409,287 | A | * | 4/1995 | Suzuki .................... 296/180.1 |
| 6,606,869 | B2 | * | 8/2003 | Takahashi et al. ............ 62/131 |
| 6,676,283 | B2 | * | 1/2004 | Ozawa et al. ............... 362/547 |

FOREIGN PATENT DOCUMENTS

| DE | 19520515 | * | 12/1996 |
| JP | 64-1671 A | | 1/1989 |

* cited by examiner

*Primary Examiner*—Dennis H. Pedder
(74) *Attorney, Agent, or Firm*—Birch, Stewart, Kolasch & Birch, LLP

(57) ABSTRACT

To provide a windscreen apparatus which can provide a good screening effect from traveling wind from the front of a driver while suppressing the height of the screen. The windscreen apparatus includes a front cowl having a screen mounted to a vehicle body. An upwardly opening air outlet port is provided at the center portion of the upper portion of the screen. An air duct for communicating the air outlet port and an air introduction port provided in the front cowl is formed in the screen.

16 Claims, 5 Drawing Sheets

WINDSCREEN APPARATUS

CROSS-REFERENCE TO RELATED APPLICATIONS

This nonprovisional application claims priority under 35 U.S.C. § 119(a) on Patent Application No. 2004-220181, filed in Japan on Jul. 28, 2004, the entirety of which is incorporated herein by reference.

BACKGROUND OF THE INVENTION

1. Field of the Invention

The present invention relates to a windscreen apparatus to be applied to a vehicle such as motorcycle.

2. Description of Background Art

In the background art, there is a windscreen apparatus of the vehicle formed with an air outlet port opening upward at the upper end portion of a portion for supporting both sides of a screen (For example, see JP-A-64-1671). In this apparatus, a wind-screening effect is improved while the height of the screen is suppressed by allowing part of traveling wind taken through an air introduction port provided on the lower side of the portion to be blown out upward from the air outlet port. The entire traveling wind is directed to avoid a driver behind the screen by means of the airflow thereof.

SUMMARY OF THE INVENTION

In the windscreen apparatus as described above, since the traveling wind is blown out from both sides of the screen in front of the driver, the screening effect is insufficient for traveling wind from the front of the driver, and hence further improvement for increasing the wind-screening effect is desired.

An agreeable cruising can be provided to a driver by employing a rather large screen to improve a wind-screening effect and to reduce noise coming into ears of the driver during travel on the highway. However, the pleasure of sport traveling can be provided to the driver by employing a rather small screen during travel on a mountain pass. A structure that can achieve both of these advantages is an object of the present. Accordingly, it is an object of the present invention to provide a windscreen apparatus which can provide a good screening effect for traveling wind from the front of the driver while suppressing the height of the screen.

As a means for achieving the above-described object, according to a first aspect of the present invention, a windscreen apparatus includes a windscreen body (for example, a front cowl 16 in an embodiment) having a screen (for example, a screen 25 in the embodiment) mounted to a vehicle body, an air outlet port (for example, an air outlet port 36 in the embodiment) opening upward is provided at the center portion of the upper portion of the screen, and an air duct (for example, an air duct 27 in the embodiment) for communicating the air outlet port and an air introduction port provided in the windscreen apparatus (for example, an air introduction port 37 in the embodiment) is formed in the screen.

In this arrangement, part of traveling wind (outside air blowing from the front of a vehicle) is blown upward from the air outlet port at the center portion of the upper portion of the screen, and the entire traveling wind is introduced so as to avoid the driver behind the screen by means of the airflow. Therefore, the screening effect of the traveling wind from the front of the driver can be improved while suppressing the height of the screen.

By providing the air duct in the screen, traveling wind can be introduced into the air outlet port efficiently, and the outcoming airflow can be directed effectively upward, whereby the number of components can be reduced and the structure is simplified.

According to a second aspect of the present invention, the air introduction port is provided at substantially the center portion of the windscreen body.

In this arrangement, the air introduction port and the air outlet port are positioned at the center portion of the windscreen body. Hence, the resistance of the airflow can be reduced without complication of an airflow path between these ports and a large area for the air introduction port can be secured easily.

According to a third aspect of the present invention, the width of the air duct decreases in the fore-and-aft direction of the vehicle body and increases in the lateral direction of the vehicle body from the air introduction port to the air outlet port.

In this arrangement, the traveling wind can be blown out in a wide range by suppressing the size of the upper portion of the screen in the fore-and-aft direction of the screen, that is, the thickness of the screen, and increasing the size of the upper portion of the screen laterally of the vehicle body, that is, the width of the screen.

According to a fourth aspect of the present invention, at least the portion of the screen including the air duct is formed of a transparent member.

In this arrangement, the driver can view the front of the vehicle specifically through the periphery of the air outlet port on the upper portion of the screen.

According to a fifth aspect of the present invention, a lighting device (for example, a high-beam side head lamp 39H in the embodiment) is provided in the air introduction port.

In this arrangement, the air introduction port can be disposed at the center portion of the vehicle body even though the lighting device is disposed at the center portion of the vehicle body (the center portion of the windscreen body).

According to a sixth aspect of the present invention, the surface area of the air introduction port and the surface area of the air outlet port are the same.

In this arrangement, since the resistance of the airflow between the air introduction port and the air outlet port does not increase and the velocity of the airflow is not lowered, the screening effect is efficiently improved.

According to the first aspect of the invention, the wind-screening effect especially at the center portion of the vehicle body which corresponds to the position of the driver's head can be improved and the noise around the ears can be reduced by reducing the size and weight of the vehicle body by suppressing the height of the screen and improving the screening effect of the traveling wind from the front of the driver. Also, the screening effect by means of the traveling wind can further be improved without using a separate duct by providing the air duct in the screen.

According to the second aspect of the invention, by reducing the resistance of the airflow, the screening effect by means of the traveling wind is improved, and hence the wind-screening effect can further be improved.

According to the third aspect of the invention, a light-looking appearance can be provided to the upper portion of the screen, and the range where the screening effect by the traveling wind can be obtained is increased, whereby the wind-screening effect can further be improved.

According to the fourth aspect of the invention, the visibility on the front side from the driver can further be improved.

According to the fifth aspect of the invention, flexibility in layout of the air introduction port and the lighting device can be improved.

According to the sixth aspect of the invention, the screening effect can be improved efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
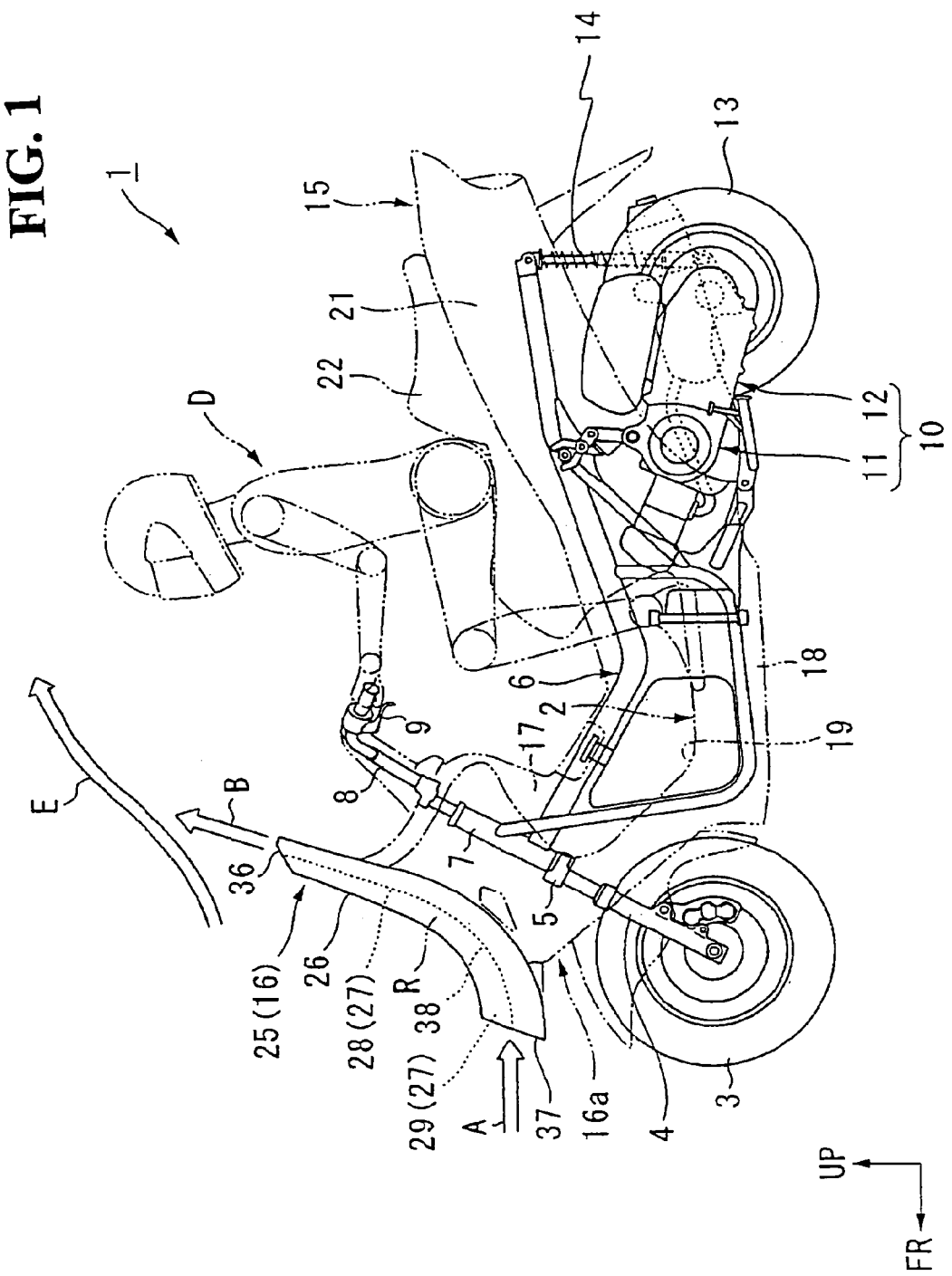
FIG. 1 is a side view of a motorcycle in an embodiment of the present invention.

Referring now to drawings, embodiments of the present invention will be described. The directions front, rear, left and right in the following description are from the perspective of a driver of the vehicle unless otherwise stated. In addition, an arrow FR in the drawings represents the front of the vehicle, an arrow LH represents the left side of the vehicle, and an arrow UP represents the upper side of the vehicle body, respectively.

A motorcycle 1 shown in FIG. 1 is a scooter type vehicle having a low-deck floor 2. However, the present invention is also applicable to other saddle-ridden type vehicles as well. A front wheel 3 is journaled by a front fork 4. The front fork 4 is steerably supported by a head pipe 7 at the front end of a vehicle body frame 6 via a handle stem 5. A handle 8 is attached to the upper end of the handle stem 5. Brake levers 9, which are operating elements of a rear brake and a front brake, are disposed respectively on left and right grip portions of the handle 8.

A swing unit 10 is supported at the rear portion of the vehicle body frame 6 so as to be capable of pivotal movement about the front end thereof. The swing unit 10 includes an engine 11 provided on the front side and a power transmitting mechanism 12 provided on the rear side. The engine 11 and the power transmitting mechanism 12 are integrally formed with each other. A rear wheel 13 is connected to the output shaft at the rear end of the power transmitting mechanism 12. A pair of left and right rear cushions or shock absorbers 14 are provided between the rear end of the swing unit 10 and the rear end of the vehicle body frame 6.

The vehicle body frame 6 is covered by a body cover 15 formed mainly of synthetic resin. The body cover 15 includes a front cowl (windscreen body) 16 for covering the front portion of the vehicle body frame 6 from the front side to the both sides. A leg shield 17 is provided for covering the front of the vehicle body frame 6 from the rear side. An under cover 18 is provided for covering the lower portion of the vehicle body frame 6 so as to continue from the lower end of the front cowl 16. A foot board 19 is provided for covering the lower portion of the vehicle body frame 6 from above. A pair of left and right side covers 21 are provided for covering the rear portion of the vehicle body frame 6.

A seat 22 for occupants (a driver and a fellow passenger on the rear side) which can open and close article storage containers (not shown) disposed in both of the side covers 21 is disposed on top of the rear portion of the vehicle body frame 6.

The occupant (driver D) seated on the front portion of the seat 22 of the motorcycle 1 takes a driving posture with both of his/her hands gripping the handle 8 and his/her legs placed on the foot board 19. At this time, the portion of the front cowl 16, which comes to the front of the driver D is configured as a screen 25 for protecting mainly the driver D from the traveling wind pressure.

Figure 2:
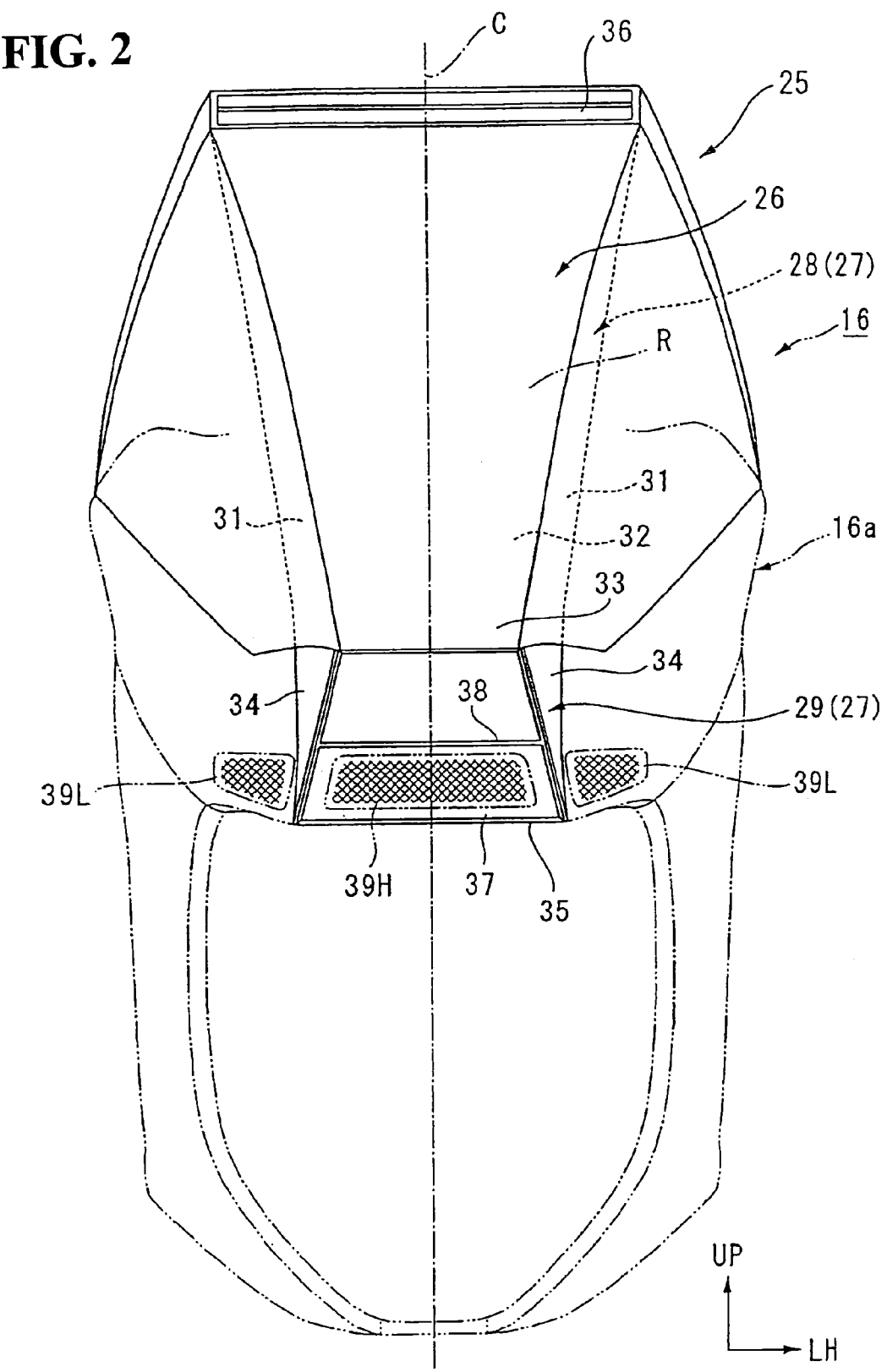
FIG. 2 is a front view of a front cowl of the above-described motorcycle.
Figure 3:
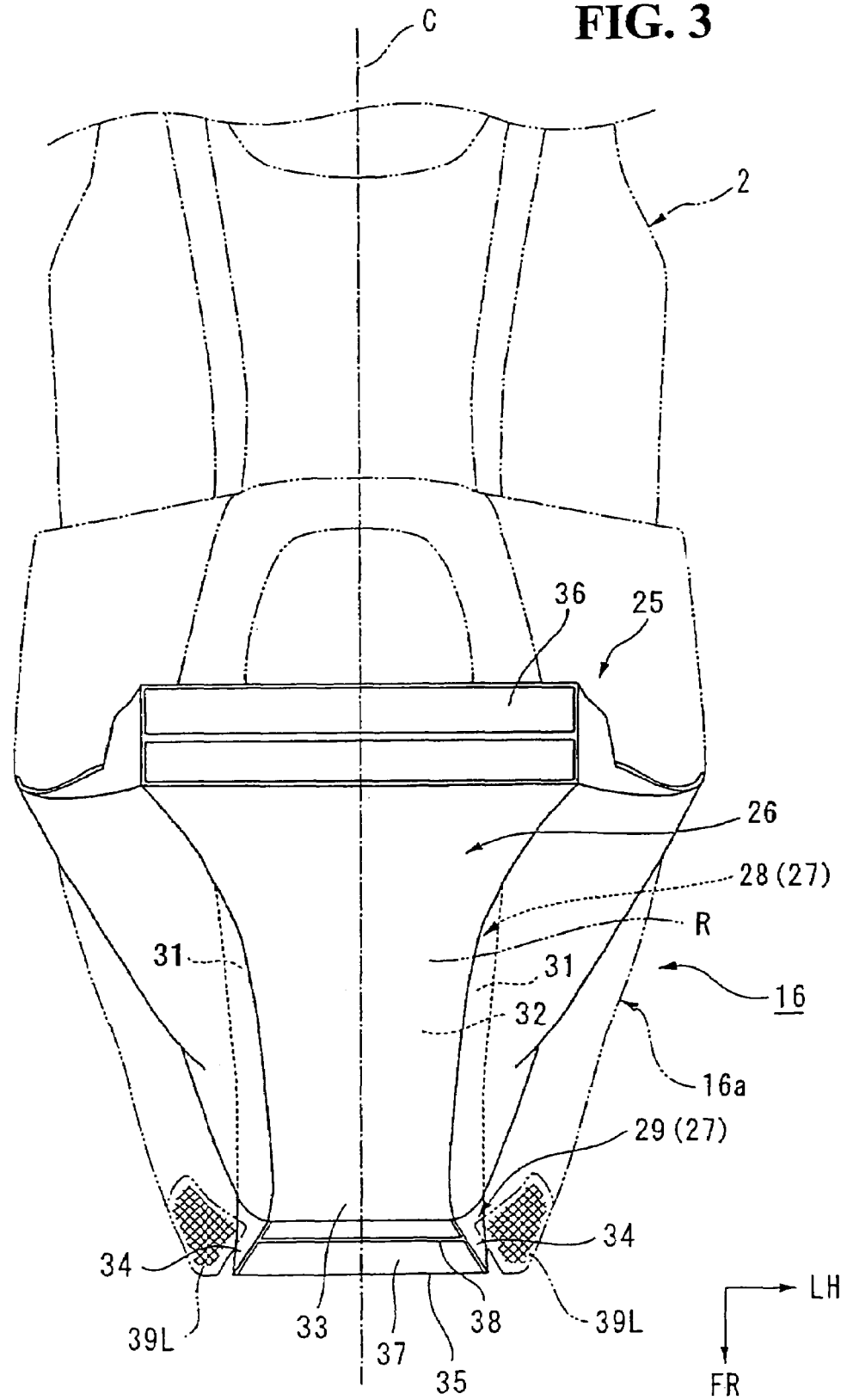
FIG. 3 is a top view of the above-described front cowl.

Referring also to FIGS. 2 and 3, the screen 25 includes a plate-shaped screen body 26, which defines the upper front surface of the front cowl 16, and an air duct 27 formed integrally with the screen body 26 on the reverse side (rear side). The screen 25 is symmetric with respect to a center plane C extending along the direction of the length of the motorcycle 1.

The screen body 26 extends obliquely upward toward the rear from the upper end of a cowl body 16a of the front cowl 16. Both ends of the screen body 26 are bent toward the rear so as to cause the outside air (traveling wind) received from the front of the vehicle to flow obliquely upward and rearward, and sideward. The upper end of the screen body 26 is formed so as to be substantially parallel with the direction of the width of the vehicle. The height of the screen body 26 is suppressed to such an extent that the screen body 26 does not interfere with the front view of the driver D.

The air duct 27 includes a duct body 28 extending along the screen body 26. An introducing portion 29 continues from the lower end of the duct body 28. The duct body 28 includes a center portion of the screen body 26 in the direction of the width of the vehicle, a pair of side wall portions 31 extending upright on the reverse side of the screen body 26, and a rear wall portion 32 extending between the rear ends of the respective side wall portions 31.

The introducing portion 29 includes an extended screen portion 33 extending from the lower end of the center portion of the screen body 26 in the direction of the width of the vehicle continuously toward the front in a curved shape. In addition, extended side wall portions 34 extend from the respective side wall portions 31 and an extended rear wall portion 35 extends from the rear wall portion 32.

The air duct 27 as described above defines an airflow path R extending from the duct body 28 to the introducing portion 29 continuously and smoothly.

An air outlet port 36 is provided at the upper end of the screen 25. The air outlet port is an upper opening of the air duct 27 defined by the upper end of the center portion of the screen body 26 in the direction of the width of the vehicle and the upper ends of both side wall portions 31 and the rear wall portions 32. An air introduction port 37 is provided at the front end of the introducing portion 29. The air introduction port 37 is a front opening surrounded by the extended screen portion 33, the extended side wall portions 34, and the extended rear wall portion 35.

The air introduction port 37 opens toward the front of the vehicle at substantially a center of the front cowl 16 in the direction of the width of the vehicle, so that outside air (traveling wind) blowing from the front of the vehicle can be introduced into the air duct 27 (see an arrow A in FIG. 1). When the outside air is introduced into the air introduction port 37 at a predetermined introduction pressure, the outside air blows obliquely upward toward the rear from the upwardly opening air outlet port 36. This airflow is indicated by an arrow B in FIG. 1.

The air introduction port 37 has a trapezoidal shape, wherein the lower side (the side of the extended rear wall portion 35) is wider in front view. The air outlet port 36 has a rectangular shape which is wider in the widthwise direction (corresponding to the lateral direction of the vehicle body) of the screen 25 than the air introduction port 37 and smaller in the thickness direction (corresponding to the fore-and-aft direction of the vehicle body) than the air introduction port 37.

The air duct 27 for communicating these ports extends from the air introduction port 37 side toward the air outlet port 36 side so as to gradually reduce the thickness and increase the width of the airflow path R. The cross-sectional area of the air duct 27 (the airflow path R) is generally the same from the air introduction port 37 to the air outlet port 36. In other words, the opening area of the air introduction port 37 and the opening area of the air outlet port 36 is substantially the same.

The air duct 27 is provided with a partitioning wall 38 for partitioning the inside thereof from the air introduction port 37 to the air outlet port 36 into an upper-side path and a lower-side path having generally the same cross-sectional area along the airflow path R. The partitioning wall 38 has a rectifying effect for the outside air flowing in the air duct 27, and an effect to increase a rigidity of the screen 25.

The screen 25, including the screen body 26 and the air duct 27, is formed of transparent resin such as polycarbonate and the portions of the screen 25 which come to both sides of the air duct 27 is, for example, printed in black (includes a black coating). In other words, the portion constituting the air duct 27 of the screen 25 is a transparent member, so that the driver D can view the front of the vehicle through the screen 25.

The lighting device may be disposed behind the rear wall portion 32 opposed to the air introduction port 37 in the fore-and-aft direction. In this embodiment, for example, a high-beam side head lamp 39H is disposed (see FIG. 2). In other words, illuminating light from the high-beam side headlamp 39H passes through the rear wall portion 32 of the air duct 27, and is irradiated toward the front of the vehicle by the air introduction port 37. On both sides of the air introduction port 37 of the front cowl 16, for example, low-beam side head lamps 39L are disposed.

By arranging the high-beam side head lamp 39H in the air introduction port 37 in this manner, the air introduction port 37 can be arranged at the center portion of the vehicle body while disposing the lamp 39H at the center portion of the vehicle body.

As described above, the windscreen apparatus according to the above-described embodiment is configured so that the front cowl 16 having the screen 25 is mounted to the vehicle body. The upwardly opening air outlet port 36 is provided at the center portion of the upper portion of the screen 25. The air duct 27 for communicating the air outlet port 36 and the air introduction port 37 provided on the front cowl 16 is disposed in the screen 25.

In this arrangement, a part of the traveling wind is blown upward from the air outlet port 36 at the center portion of the upper portion of the screen 25 (see an arrow B in FIG. 1). This part of the traveling wind is introduced into the entire traveling wind (see an arrow E in FIG. 1). The upward airflow of the part of the traveling wind causes an air flow that avoids the driver D behind the screen 25. Therefore, a screening effect by means of the traveling wind (airflow) from the front of the driver D can be improved while suppressing the height of the screen.

By achieving a reduction in size and weight of the vehicle body while suppressing the height of the screen, and improving the screening effect of the traveling wind from the front of the driver D, the wind-screening effect especially at the center portion of the vehicle body, which corresponds to the position of the occupant's (driver D's) head, can be improved, and the noise around the head can be reduced.

By providing the air duct 27 in the screen 25, the traveling wind can be introduced to the air outlet port 36 efficiently and the outcoming airflow can be directed upward effectively. Therefore, the screening effect by means of the traveling wind can further be improved without using a separate duct, and a reduction of the number of components and simplification of the structure can be achieved.

In particular, by providing the partitioning wall 38 along the airflow path R in the air duct 27, the traveling wind can blow out upward well from the air outlet port 36 by the rectifying effect of the partitioning wall 38, and hence the screening effect by means of the traveling wind can further be improved.

In the above-described windscreen apparatus, with the air introduction port 37 being disposed substantially at the center of the front cowl 16, the air introduction port 37 and the air outlet port 36 are positioned at the center portion of the front cowl 16. Therefore, the resistance of the airflow can be reduced without complication of the airflow path R between these ports and a large area for the air introduction port 37 can be secured easily. Consequently, the screening effect by means of the traveling wind can be improved, and the wind-screening effect can further be improved.

In addition, in the above-described windscreen apparatus, by decreasing the width of the air duct 27 in the fore-and-aft direction of the vehicle body and increasing in the lateral direction of the vehicle body from the air introduction port 37 to the air outlet port 36, the size of the upper portion of the screen 25 in the fore-and-aft direction of the vehicle body, that is, the thickness of the screen 25 is suppressed and hence a light-looking appearance can be provided. Also, by increasing the width of the upper portion of the screen 25 in the lateral direction of the vehicle body, that is, the width of the screen 25 to allow the traveling wind to blow out in a wide range, the range for obtaining the screening effect by the traveling wind is increased, whereby the wind-screening effect can further be improved.

Furthermore, in the above-described windscreen apparatus, the portion constituting the air duct 27 of the screen 25 is formed of a transparent member. Therefore, the driver D can view the front of the vehicle through especially the periphery of the air outlet port 36 on the upper portion of the screen 25, whereby the front visibility from the driver D can further be improved.

In addition, in the above-described windscreen apparatus, the lighting device (the high-beam side head lamp 39H) is provided in the air introduction port 37. Therefore, the air introduction port 37 can be disposed at the center portion of the vehicle body even though the lighting device is disposed at the center portion of the vehicle body (the center portion of the front cowl 16). Hence, flexibility of the layout of the air introduction port 37 and the lighting device can be improved.

In the above-described windscreen apparatus, the surface area of the air introduction port 37 and the surface area of the air outlet port 36 are the same. Therefore, the resistance of the airflow between the air introduction port 37 and the air outlet port 36 does not increase and the velocity of the airflow is not lowered, whereby the screening effect is efficiently improved.

Figure 4A:
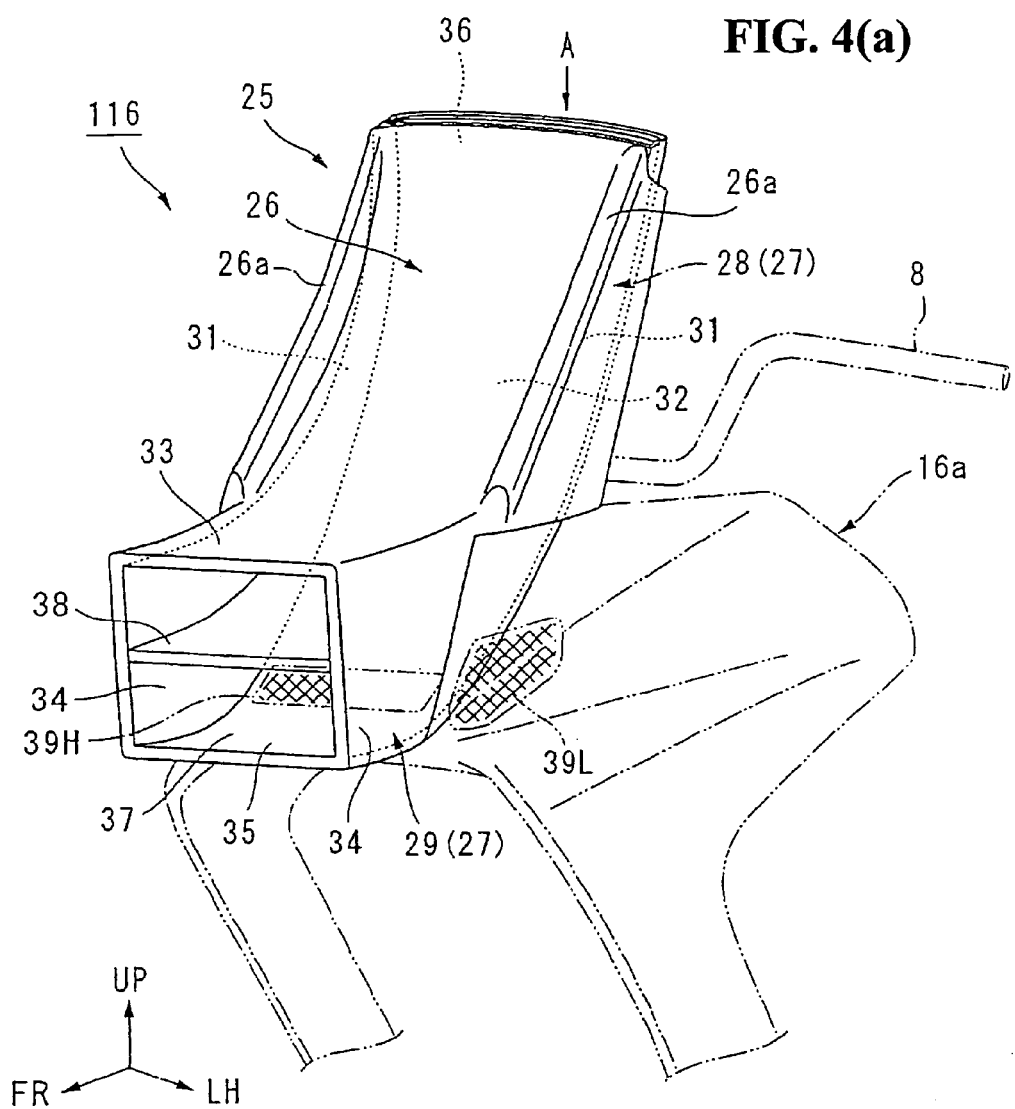
FIG. 4(a) is a perspective view showing a modification of the above-described front cowl.

The invention is not limited to the above-described embodiment. For example, as a front cowl (windscreen body) 116 shown in FIG. 4(a), it is also possible to employ a structure in which the screening effect by means of the traveling wind is further improved by providing rail-shaped guide members 26a extending between the upper and lower ends at both sides of the front portion of the screen body 26 and introducing the outside air flowing on the surface of the screen body 26 preferably by the rectifying effect of the guide member 26a.

Figure 4B:
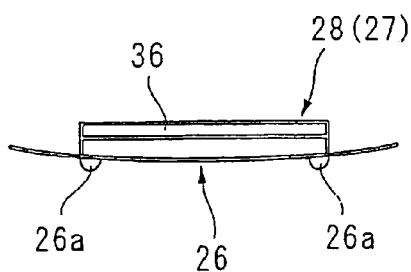
FIG. 4(b) is a drawing viewed in the direction indicated by an arrow A in FIG. 4(a)
Figure 5:
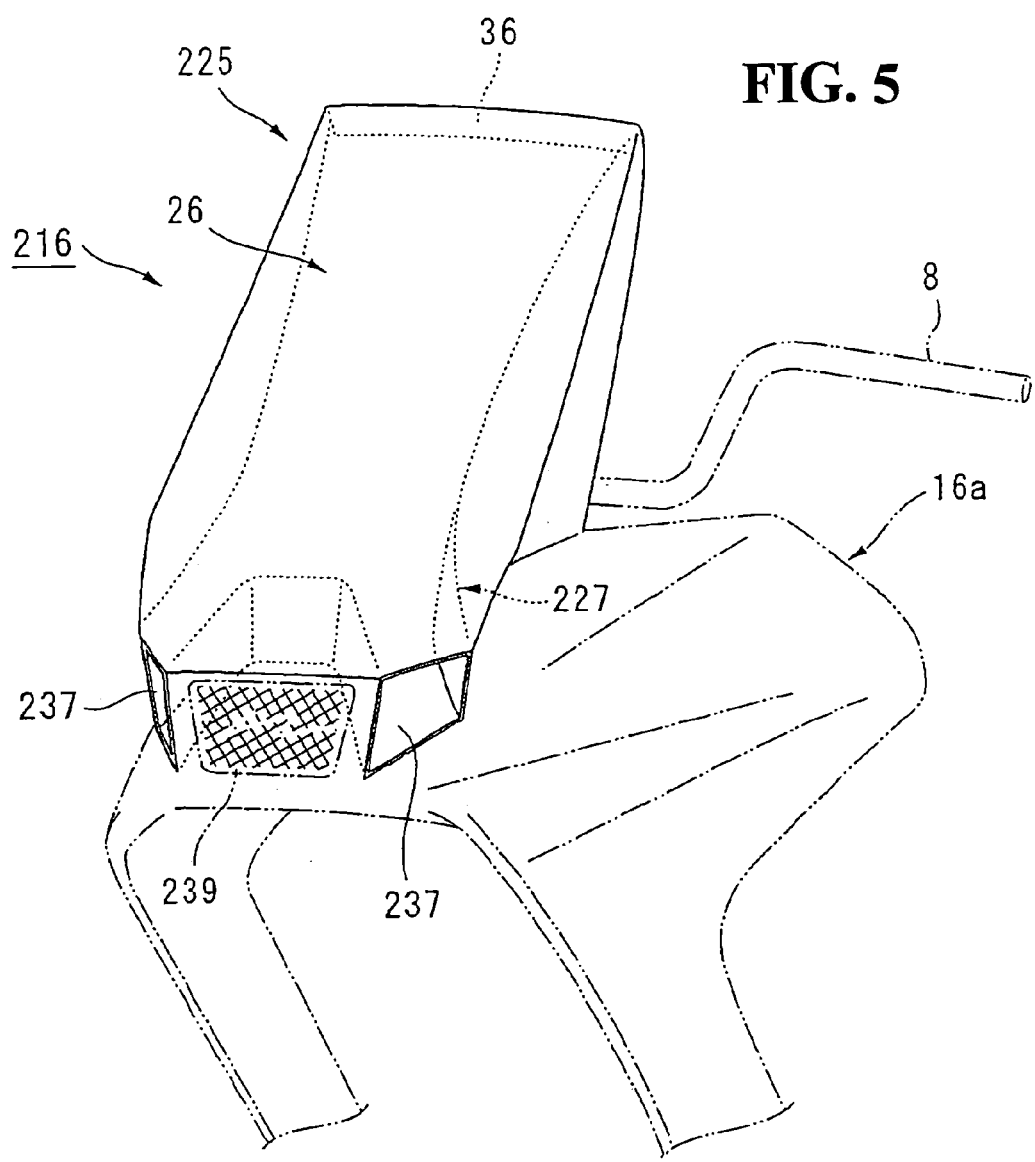
FIG. 5 is a perspective view showing another modification of the above-described front cowl.

Also, it is also possible to employ a structure in which an air duct 227 being provided in a screen 225 and including air introduction ports 237 distributed to the left and right with respect to the center of the width of the vehicle is branched to the left and right at its upstream side to communicate the respective air introduction ports 237 and the air outlet port 36 as a front cowl (windscreen body) 216 as shown in FIG. 5. In this case, a headlight 239 may be disposed between the branched paths of the air duct 227 on the upstream side. In FIGS. 4 and 5, the parts corresponding to the above-described embodiment are represented by the same reference numerals and description thereof will be omitted.

In addition, the cross-sectional area of the airflow path R of the air duct 27 (and the above-described air duct 227) may be reduced or increased from the air introduction port 37 to the air outlet port 36. In other words, the opening area of the air introduction port 37 may be set to an area larger or smaller than the opening area of the air outlet port 36. In this case, the screening effect according to the object of the present invention can be achieved by increasing or reducing the velocity of the outside air flowing in the air duct 27 in blowing out.

In addition, the air introduction port 37 may be provided, for example, at both sides of the screen body 26, instead of providing below the screen body 26 so as to continue therefrom. It is also possible to allow the upstream side of the air duct 27 (and the above-described air duct 227) to pass through the inside of the cowl body 16a and provide the air introduction port 37 at a desired portion of the cowl body 16a. In this case, the entire screen 25 (and the above-described screen 225) may be a transparent member, and may be formed of colored transparent resin. In contrast, the screen 25 (and the above-described screen 225) may be opaque entirely or may be coated entirely since the height of the screen can be suppressed.

It is also possible to provide a plurality of the partitioning walls 38 according to the cross-sectional area of the airflow path R (the opening areas of the air introduction port 37 and the air outlet port 36) of the air duct 27 so that the airflow path R is partitioned into two or more stages.

Furthermore, the lighting device to be disposed in the air introduction port 37 may be a headlamp provided with both functions of high-beam and low-beam and the lighting devices disposed on both sides of the air introduction port 37 are replaced by winkers (turn signals or blinkers).

The structures in the above-described embodiment are shown simply as examples, and may be applied to two-wheel vehicles other than the scooter-type vehicle, three-wheel vehicles and four-wheel vehicles as a matter of course, and needless to say, various modifications may be made without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windscreen apparatus comprising:
   a windscreen body having a transparent screen integrally formed therein, the windscreen body being mounted to a vehicle body,
   wherein an upwardly opening air outlet port is provided at a center portion of an upper portion of the screen, and an air duct for communicating the air outlet port and an air introduction port provided in the windscreen body is formed in the screen,
   wherein a thickness of the air duct decreases and a width of the air duct increases in the fore-and-aft direction of the vehicle body from the air introduction port to the air outlet port.

2. The windscreen apparatus according to claim 1, wherein the air introduction port is provided at substantially the center portion of the windscreen body.

3. The windscreen apparatus according to claim 1, wherein at least a portion of the screen including the air duct is formed of a transparent member.

4. The windscreen apparatus according to claim 2, wherein at least a portion of the screen including the air duct is formed of a transparent member.

5. The windscreen apparatus according to claim 1, wherein a lighting device is provided in the air introduction port.

6. The windscreen apparatus according to claim 2, wherein a lighting device is provided in the air introduction port.

7. The windscreen apparatus according to claim 1, wherein a surface area of the air introduction port and a surface area of the air outlet port are the same.

8. The windscreen apparatus according to claim 2, wherein a surface area of the air introduction port and a surface area of the air outlet port are the same.

9. The windscreen apparatus according to claim 1, wherein the air duct is provided with a partitioning wall for partitioning an inside of the air duct from the air introduction port to the air outlet port into an upper-side path and a lower-side path having generally the same cross-sectional area for a length thereof.

10. A windscreen apparatus for a saddle ridden vehicle, comprising:
    a body frame;
    a windscreen body having a transparent screen integrally formed therein, the windscreen body mounted to a front of the body frame;
    an air duct formed in the screen, the air duct including an air introduction port in communication with an upwardly opening air outlet port, the upwardly opening outlet port being located at an upper edge of a center portion of the screen, wherein the air duct is provided with a partitioning wall for partitioning an inside of the air duct from the air introduction port to the air outlet port into an upper-side path and a lower-side path having generally the same cross-sectional area for a length thereof.

11. The windscreen apparatus according to claim 10, wherein the air introduction port is provided at substantially the center portion of the screen.

12. The windscreen apparatus according to claim 10, wherein a thickness of the air duct decreases and a width of the air duct increases in the fore-and-aft direction of the vehicle body from the air introduction port to the air outlet port.

13. The windscreen apparatus according to claim 10, wherein at least a portion of the windscreen body including the air duct is formed of a transparent member.

14. The windscreen apparatus according to claim 10, wherein a lighting device is provided in the air introduction port.

15. The windscreen apparatus according to claim 10, wherein a surface area of the air introduction port and a surface area of the air outlet port are the same.

16. A windscreen apparatus comprising:

a windscreen body having a screen mounted to a vehicle body, wherein an upwardly opening air outlet port is provided at a center portion of an upper portion of the screen, and an air duct for communicating the air outlet port and an air introduction port provided in the windscreen body is formed in the screen; and wherein the air duct is provided with a partitioning wall for partitioning an inside of the air duct from the air introduction port to the air outlet port into an upper-side path and a lower-side path having generally the same cross-sectional area for a length thereof.

* * * * *